(12) United States Patent
Barnett

(10) Patent No.: US 6,543,724 B1
(45) Date of Patent: Apr. 8, 2003

(54) MINIATURE SATELLITE DESIGN

(75) Inventor: David M. Barnett, Littleton, CO (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/610,056

(22) Filed: Jul. 5, 2000

Related U.S. Application Data

(60) Provisional application No. 60/145,164, filed on Jul. 22, 1999.

(51) Int. Cl.[7] ................................................. B64G 1/10
(52) U.S. Cl. ....................................................... 244/173
(58) Field of Search ........................... 244/158 R, 173, 244/163; 343/915, DIG. 2, 908; 126/411, 440, 417

(56) References Cited

U.S. PATENT DOCUMENTS

| | | | | |
|---|---|---|---|---|
| 3,459,391 A | * | 8/1969 | Haynos ........................ 244/173 |
| 4,588,151 A | * | 5/1986 | Mori ............................ 244/173 |
| 4,634,086 A | * | 1/1987 | Mori ............................ 244/173 |
| 4,811,034 A | * | 3/1989 | Kaminskas .................. 343/915 |
| 4,815,525 A | * | 3/1989 | Readman ..................... 244/163 |
| 5,052,640 A | * | 10/1991 | Chang .......................... 244/173 |
| 5,228,644 A | * | 7/1993 | Garriott el al. ............... 244/173 |
| 5,386,953 A | | 2/1995 | Stuart ....................... 244/158 R |
| 5,600,868 A | * | 2/1997 | Tourville et al. |

* cited by examiner

Primary Examiner—Galen L. Barefoot
(74) Attorney, Agent, or Firm—Marsh Fischmann & Breyfogle LLP

(57) ABSTRACT

The invention is a micro-satellite assembly. In detail, the invention includes first and second flat structural members containing the satellite payload. First and second tubular elements connect first and second structural members such that they are in a spaced relationship. A plurality of solar panels are movably to the tubular elements between the first and second structural elements, movable from a stored position between the structural elements to an deployed position external of these structural members. A mechanism is provided for biasing the plurality of the solar panels to the deployed position. A second mechanism is used to releasably secure the plurality of solar panels in the stored position.

30 Claims, 5 Drawing Sheets

MINIATURE SATELLITE DESIGN

RELATED APPLICATIONS

This application is a continuation-in-part of co-pending Provisional Patent Application Serial No. 60/145,164, "Multifunctional Structure Nano-Satellite", filed Jul. 22, 1999.

BACKGROUND OF THE INVENTION

1. Field of the Invention

The invention relates to the field of spacecraft, such as satellites or space probes and, in particular, to a miniature low cost spacecraft that can be packaged with other similar vehicles.

2. Description of Related Art

In an attempt to reduce the cost of space exploration and orbital earth sensor satellites, small single purpose satellites have been developed. However, there has been little effort to standardize the design of the buss, or payload carrying structure. U.S. Pat. No. 5,386,953 "Spacecraft Designs For Satellite Communication System" by J. R. Stuart discloses a hemispherical shaped satellite design using a tubular truss assembly to support a series of antennas that allows stacking of a series thereof. Another attempt also disclosed in the above referenced patent is to use an inflatable torus shaped structure. However, neither of these approaches is suitable for use with micro-sized satellites. First of all the truss assembly is a high cost structure for use with a really small satellite. The inflatable satellite requires a storable gas and a control system for inflation, again adding cost.

Thus, it is a primary object of the invention to provide a micro-satellite design.

It is another primary object of the invention to provide a micro-satellite design that can be stored in a very small volume.

It is a further object of the invention to provide a micro-satellite design that can be efficiently stacked such that a single booster can be used to launch a large number of them.

SUMMARY OF THE INVENTION

The invention is a micro-satellite assembly. In detail, the invention includes first and second flat structural members containing the satellite payload. Preferably, the first and second structural members are circular shaped having peripheral surfaces and equal diameters. First and second tubular elements connect the first and second structural members such that they are in a spaced relationship. Preferably, the tubular elements are connected at the peripheral surfaces and spaced 180 degrees apart. A plurality of solar panels are movably to the tubular elements between the first and second structural elements, movable from a stored position between the structural elements to a deployed position external of these structural members. Preferably there are four solar panels with a first pair mounted to the first tubular element and the second pair mounted to the second tubular element. Each individual solar panel of each pair is rotatable from the stored position to the deployed position in opposite directions.

A mechanism is provided for biasing the plurality of the solar panels to the deployed position, which includes a spring coiled about the tubular element having a first end attached thereto and a second end attached to the individual solar panel. A second mechanism is used to releasably secure the solar panels in the stored position. A third mechanism is included for releasably securing the solar panels in the deployed position.

The novel features which are believed to be characteristic of the invention, both as to its organization and method of operation, together with further objects and advantages thereof, will be better understood from the following description in connection with the accompanying drawings in which the presently preferred embodiment of the invention is illustrated by way of example. It is to be expressly understood, however, that the drawings are for purposes of illustration and description only and are not intended as a definition of the limits of the invention.

DESCRIPTION OF THE PREFERRED EMBODIMENT

Figure 1:
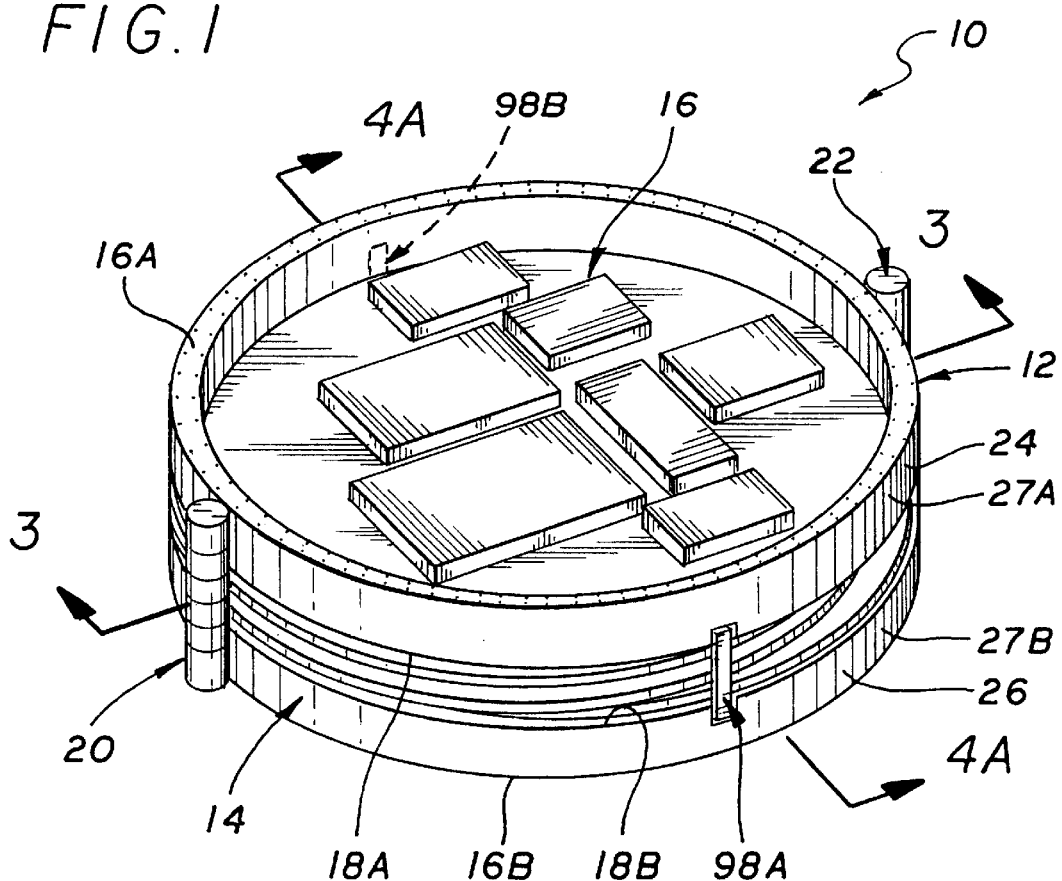
FIG. 1 is a perspective view of the subject micro-satellite with the solar panels retracted.

Referring to FIGS. 1–3, 4A and 4B, the micro-satellite, generally indicated by numeral 10 includes two circular structural members 12 and 14, in which is mounted the payload 16 of the satellite. The two structural members 12 and 14 have externally facing surfaces 16A and 18A and inward facing surfaces 16B and 18B and are separated by a pair of tubular elements 20 and 22 connected to the peripheral surfaces 24 and 26 of the members 12 and 14. Each structural member would incorporate a propulsion ring 27A and 27B providing station keeping control, for example multiple one shot jets. Solar Panels 24A and 24B are pivotally connected to the tubular element 20 and solar panels 26A and 26B are pivotally connected to tubular element 22 in a manner to be subsequently described. The solar panels all have a width indicated by numeral 27.

The tubular element 20 includes cup shaped ends 28 and 30, with holes 32 and 34, respectively, therethrough and with the interior of the cup portions indicated by numerals 35 and 36. A pin 37 having shoulders 38 and 40 and threaded shafts 42 and 44 that extend through the holes 32 and 34 and retained by nuts 46 and 48. Thus the pin 37 space the two structural members 12 and 14 apart by a distance indicated by numeral 50. Solar panels 24A and 24B include lugs 58 and 60 with holes 62 and 64 therethrough are rotatably mounted on the pin 37. Lug 60 includes a spacer portion 65 having a width 66. A spacer 67 having a width 68 slightly larger than the width 27 of the solar panels also having a hole 69 therethrough is mounted on the pin 37.

A spring 70 is mounted in the cup portion 35 of the cup shaped end 28 and is wrapped about the pin 37 having a first end 72 engaged with hole 74 in the cup shaped end 28 and the second end 76 engaged with hole 78 in the lug 58 of the solar panel 24A. A spring 80 is mounted in the cup portion 36 of the cup shaped end 30 and is wrapped about the pin 37 having a first end 82 engaged with hole 84 in the cup shaped end 30 and the second end 86 engaged with hole 88 in the lug 60 of the solar panel 24B. Thus the springs 70 and 80 bias the solar panels 24A and 24B in opposite directions.

Tubular element 22 is similar to tubular element 20. The tubular elements 22 therefore includes cup shaped ends 28' and 30', with holes 32' and 34', respectively, therethrough and with the interior of the cup portions indicated by numerals 35' and 36'. A pin 37' having shoulders 38' and 40' and threaded shafts 42' and 44' that extend through the holes 32' and 34' and retained by nuts 46' and 48'. Thus the pin 37' also space the two structural members 12 and 14 apart by a distance indicated by numeral 50. Solar panels 26A and 26B include lugs 58' and 60' with holes 62' and 64' therethrough is rotatably mounted on the pin 37'. Lug 60' includes a spacer portion 65' having a width 66'. A spacer 67' having a width 68' slightly larger than the width 25' of the solar panels also having a hole 69' therethrough is mounted on the pin 37'.

A spring 70' is mounted in the cup portion 35' of the cup shaped end 28' and is wrapped about the pin 37' having a first end 72' engaged with hole 74' in the cup shaped end 28' and the second end 76' engaged with hole 78' in the lug 58' of the solar panel 26A. A spring 80' is mounted in the cup portion 36' of the cup shaped end 30' and is wrapped about the pin 37' having a first end 82' engaged with hole 84' in the cup shaped end 30' and the second end 86' engaged with hole 88' in the lug 60' of the solar panel 26B. Thus the springs 70' and 80' bias the solar panels 26A and 26B in opposite directions. With the solar panels 24A, B and 26A, B are offset from each other and can be overlapped with each other when in the stored position shown in FIG. 2.

Figure 3:
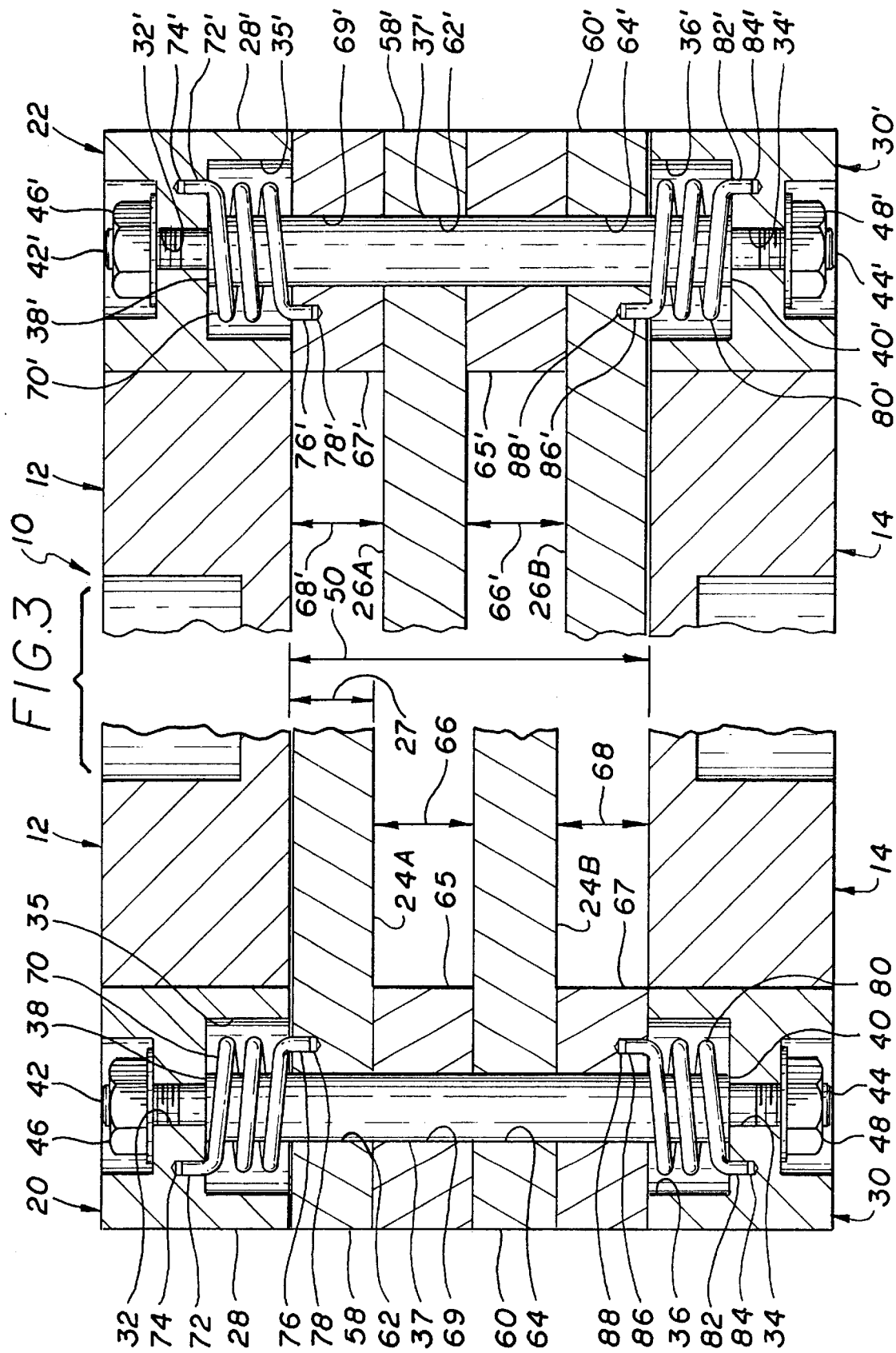
FIG. 3 is a partial cross-sectional view of FIG. 1 taken along the line 3—3, illustrating the biasing mechanism for the solar panels.
Figure 4:
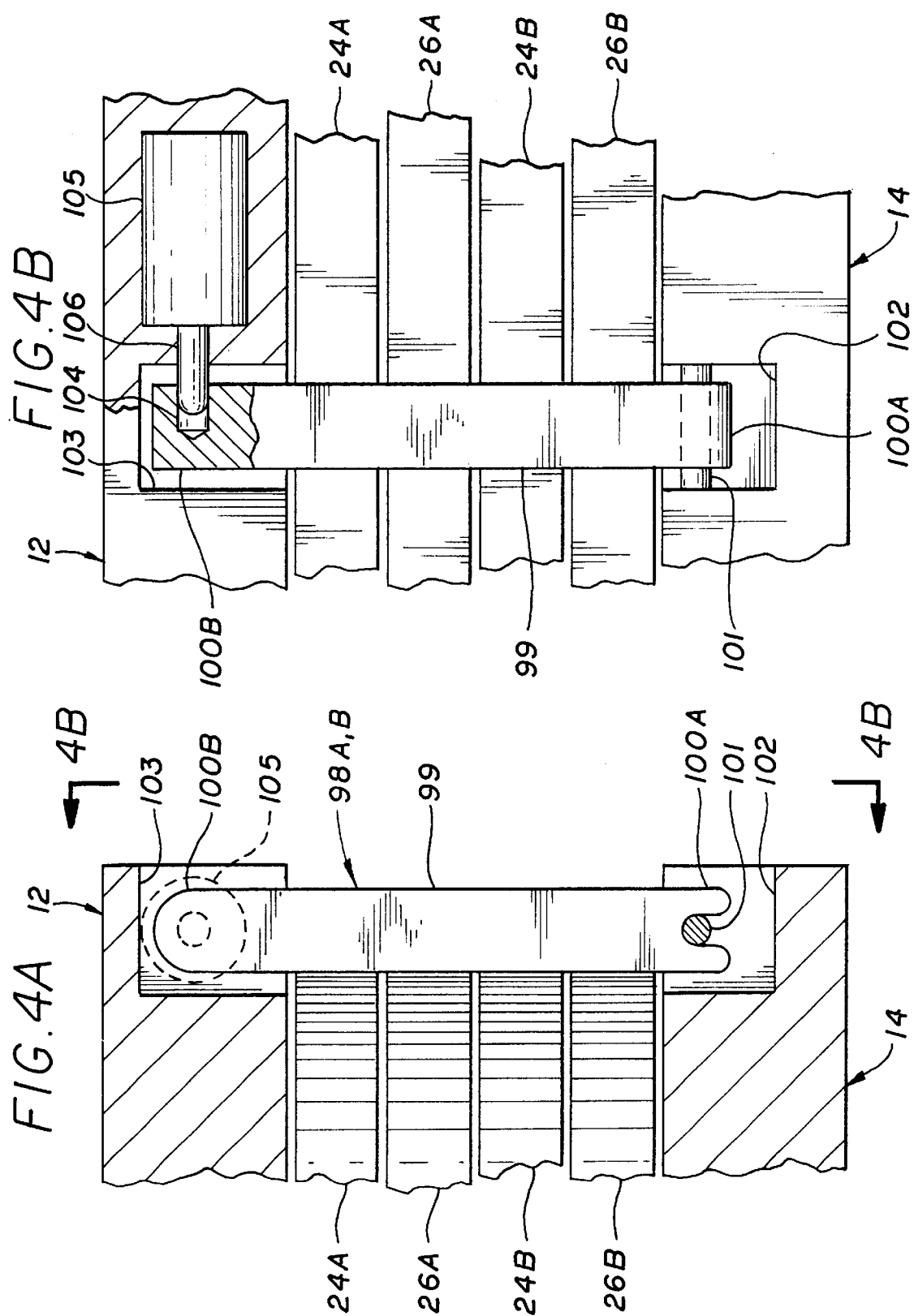
FIG. 4A is a partial cross-sectional view of FIG. 1 taken along the line 4A—4A, illustrating the mechanism for releasably restraining the solar panels in the stored position.
FIG. 4B is an enlarged partial cross-sectional view of FIG. 1 taken along the line 4B—4B illustrating the solar panel restraining system for locking the solar panels in the stored position.
Figure 5:
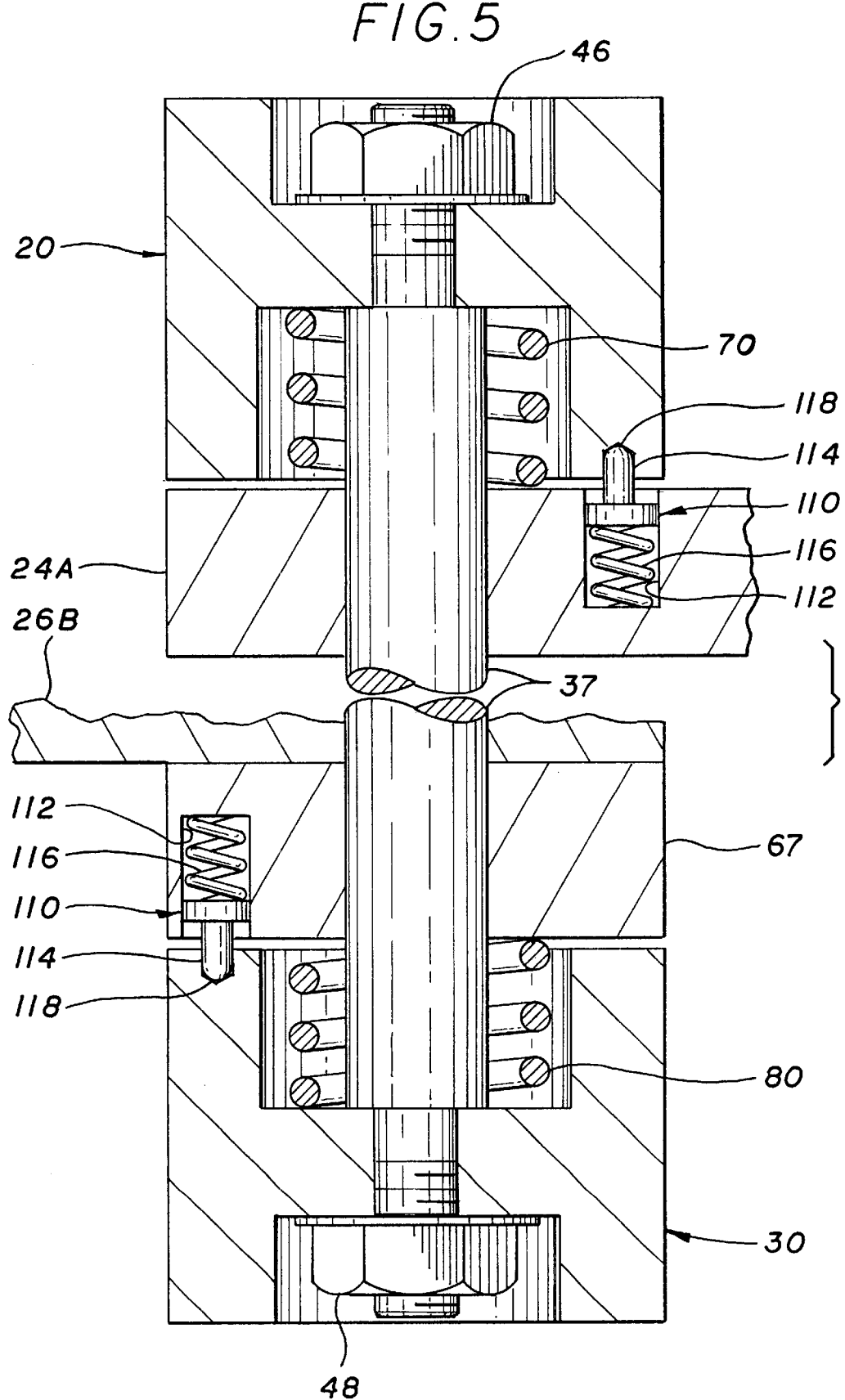
FIG. 5 is an enlarged partial view of FIG. 2 illustrating the solar panel restraining system for locking the solar panels in the deployed position.

Referring particular to FIGS. 4A and 4B, the solar panels 24A, B and 26A, B are retained in the stored position shown in FIGS. 1 and 3 by means of retainers 98A and 98B mounted between the structural members 12 and 14. The retainers 98A, B include a rod 99 pivotally mounted at a forked first end 100A to a pin 101 mounted in a groove 102 in structural member 14. The second end 100B of the rod 99 extends into a groove 103 in the structural element 12 and includes an indentation 104. The rod 99 is retained by a solenoid operated pin puller device 105 having a pin 106 engaged with the indentation 104. Thus when the device 105 is actuated by electrical current from a power source (not shown) the pin 106 is retracted from the indentation 104 in the second end 100B of the rod 99. At this point, the solar panels 24A, B and 26A, B, which as previously discussed are spring biased to the deployed position, can rotate the rods 99 about the pin 101 and to fully deploy as the rods are pushed clear of the satellite. Such devices are old in the art and need not be discussed in further detail. It should be obvious that other restraining systems could be used, for example ones using shape memory alloys.

Figure 2:
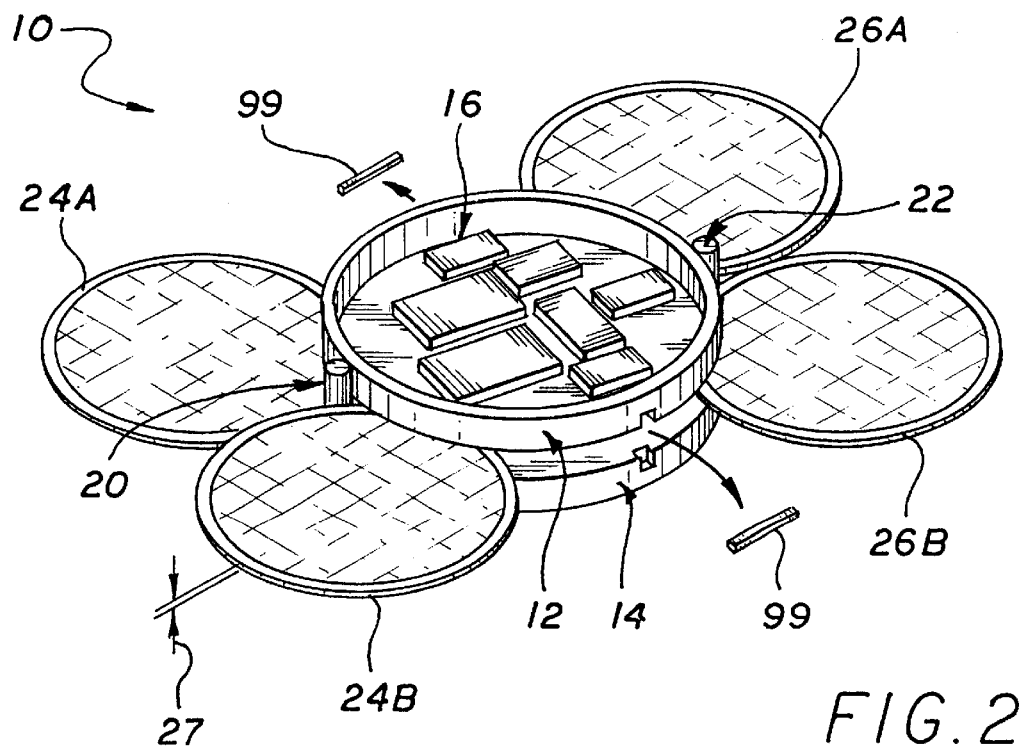
FIG. 2 is a perspective view of the subject micro-satellite illustrated in FIG. 1 with the solar panels deployed.

When release of the solar panels is required, the devices 102 mounted in the structural member 12 are actuated, releasing the solar panels such that they can move the deployed position shown in FIG. 2. Referring to Figure, to insure that the solar panels 24A, B and 26A, B once deployed, remain deployed, each have a spring biased retainer or détente 110 mounted in the lugs 58 and 60, and 58' and 60'. The détente 110 includes a hole 112 in the lugs 58, 60, 58' and 60' incorporating a pin 114 biased by a spring 116 on one side thereof. Each cup shaped end 28, 30, 28' and 30' include and indentation 118. Thus as the springs 70 and 80 rotate the solar panels to the deployed positions, pin 114 become aligned with and engage the indentations 118 when fully the solar panels are deployed and become locked in place.

Figure 6:
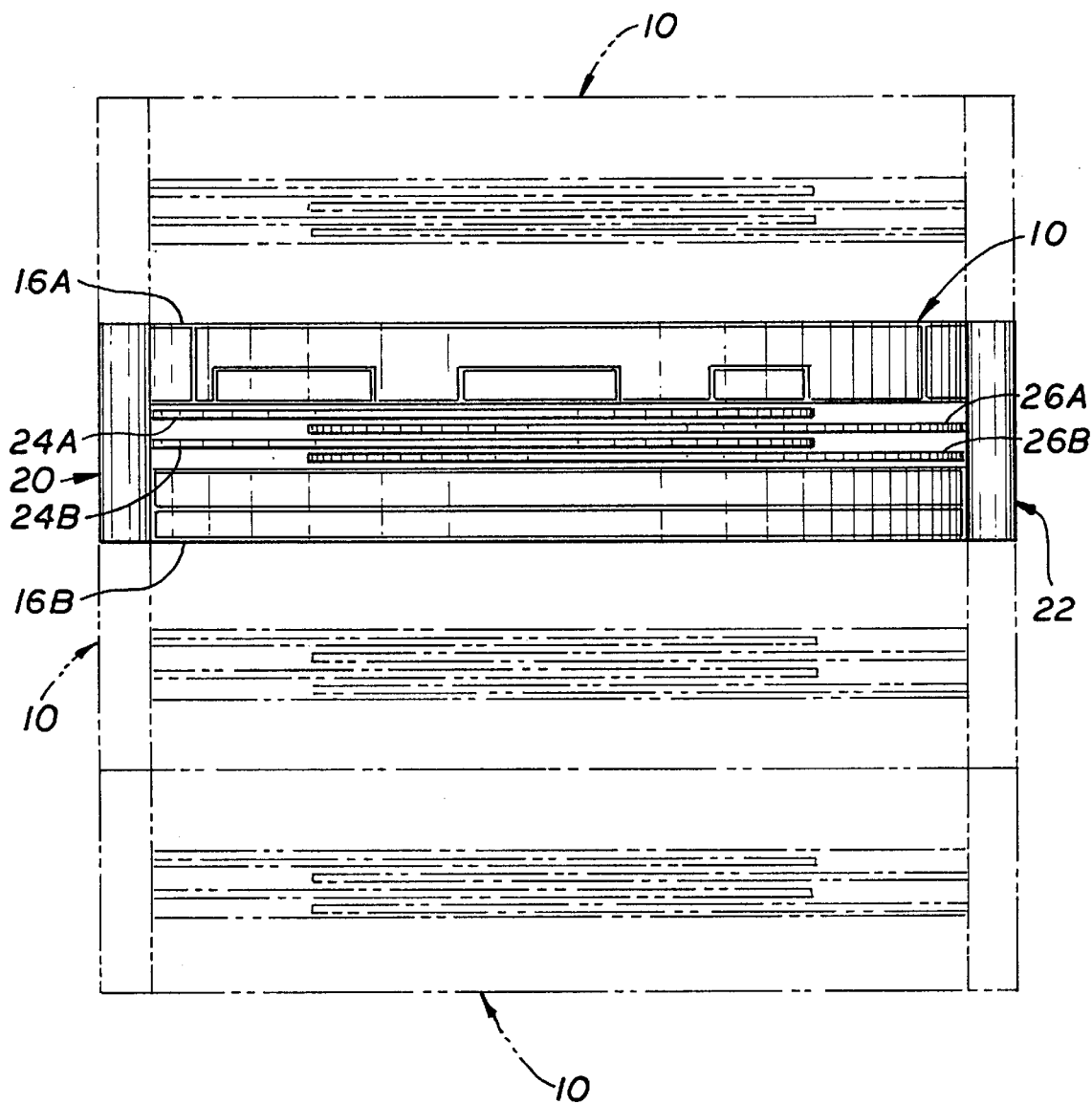
FIG. 6 is a side elevation view of a plurality of the subject micro-satellites stacked for mounting in a lunch booster.

Referring to FIG. 6, it can be seen that when the microsatellites have the solar panels 24A, B and 26A, B in the stored position, they can be easily stored one on top of each other in a small volume. Thus a launch booster can carry a large number into orbit. Furthermore, the solar panel deployment mechanism, retention mechanism for releasably retaining the solar panels in the stored and deployed positions may very from those illustrated. For example, the solar panel extension mechanism could employ shape memory alloy materials to accomplish deployment.

While the invention has been described with reference to a particular embodiment, it should be understood that the embodiment is merely illustrative, as there are numerous variations and modifications, which may be made by those skilled in the art. Thus, the invention is to be construed as being limited only by the spirit and scope of the appended claims.

INDUSTRIAL APPLICABILITY

The invention has applicability to the spacecraft industry.

What is claimed is:

1. A satellite assembly, comprising:
   a plurality of solar panels disposed in stacked relation when in stored position, wherein each of said plurality of solar panels are movable from said stored position to a deployed position, wherein each of said plurality of solar panels are disposed at a different elevation in both said stored and deployed positions and in parallel relations to each other in both said stored and deployed positions.

2. A satellite assembly, as claimed in claim 1, further comprising:
   a first structural member; and
   a second structural member disposed in spaced relation to and interconnected with said first structural member.

3. A satellite assembly, as claimed in claim 2, wherein:
   said first and second structural members are both circular and are of equal diameter.

4. A satellite assembly, as claimed in claim 2, wherein:
   said first and second structural members are disposed in parallel relation.

5. A satellite assembly, as claimed in claim 2, wherein:
   said first and second structural members are at least generally disc-shaped.

6. A satellite assembly, as claimed in claim 2, further comprising:
   first and second connectors extending between and connected with each of said first and second structural members.

7. A satellite assembly, as claimed in claim 6, wherein:
   said first and second connectors are disposed 180 degrees apart.

8. A satellite assembly, as claimed in claim 6, wherein:
   each of said plurality of solar panels is pivotally connected with either of said first and second connectors.

9. A satellite assembly, as claimed in claim 6, wherein:
   said plurality of solar panels comprises first, second, third, and fourth solar panels, wherein said first and second solar panels are pivotally connected with said first connector, and wherein said third and fourth solar panels are pivotally connected with said second connector.

10. A satellite assembly, as claimed in claim 9, wherein:

said first and second connectors are disposed 180 degrees apart.

11. A satellite assembly, as claimed in claim 8, wherein:

said plurality of solar panels are symmetrically disposed about a first reference axis when in said deployed position, wherein said first reference axis is parallel to an axis about which each of said plurality of solar panels pivot, and wherein said first reference axis is perpendicular to a separate reference plane in which each of said plurality of solar panels is disposed.

12. A satellite assembly, as claimed in claim 8, wherein:

said first and second structural members each comprise a peripheral surface, wherein said plurality of solar panels do not extend beyond said peripheral surface when in said stored position, and wherein said plurality of solar panels do extend beyond said peripheral surface when in said deployed position.

13. A satellite assembly, as claimed in claim 8, wherein:

a first portion of each of said plurality of solar panels remains disposed between said first and second structural members in said deployed position, while a second portion of each of said plurality of solar panels extends beyond said first and second structural members in said deployed position.

14. A satellite assembly, as claimed in claim 1, further comprising:

means for biasing each of said plurality of solar panels toward said deployed position.

15. A satellite assembly, as claimed in claim 14, wherein:

said means for biasing comprises a separate spring for each of said plurality of solar panels.

16. A satellite assembly, as claimed in claim 1, further comprising:

a separate deployment spring for each of said plurality of solar panels.

17. A satellite assembly, as claimed in claim 1, further comprising:

means for pivoting each of said plurality of solar panels from said stored position to said deployed position while maintaining each of said plurality of solar panels in parallel relation to each other throughout movement from said stored position to said deployed position.

18. A method for operating a satellite assembly comprising a first solar panel, a second solar panel, a third solar panel, and a fourth solar panel, said method comprising the steps of:

maintaining said plurality of solar panels in a stored position;

moving said plurality of solar panels from said stored position to a deployed position, wherein said moving step comprises pivoting said first and second solar panels about a first axis, in opposite directions, and in first and second reference planes, and pivoting said third and fourth solar panels about a second axis, in opposite directions, and in third and fourth reference planes, wherein said first and second reference planes are vertically offset and parallel to each other, and wherein said third and fourth reference planes are vertically offset and parallel to each other.

19. A satellite assembly, as claimed in claim 18, wherein:

said maintaining step comprises disposing said plurality of solar panels in parallel relation.

20. A satellite assembly, as claimed in claim 18, wherein:

said maintaining step comprises disposing said plurality of solar panels in stacked relation.

21. A satellite assembly, as claimed in claim 18, wherein:

said maintaining step comprises disposing said plurality of solar panels in both a parallel and stacked relation.

22. A satellite assembly, as claimed in claim 18, wherein:

said first and second axes are parallel to each other.

23. A satellite assembly, as claimed in claim 18, wherein:

said first, second, third, and fourth reference planes are vertically offset and parallel to each other.

24. A satellite assembly, as claimed in claim 18, wherein:

said first and second axes are parallel to each other, and wherein said first, second, third, and fourth reference planes are vertically offset and parallel to each other.

25. A satellite assembly, as claimed in claim 18, wherein:

said moving step comprises pivoting said first, second, third, and fourth, solar panels along parallel paths throughout said moving step.

26. A satellite assembly, as claimed in claim 18, wherein:

said first and second axes are 180 degrees apart.

27. A satellite assembly, as claimed in claim 18, further comprising:

means for pivoting said first and second solar panels about said first connector in opposite directions from said stored position to said deployed position; and means for pivoting said third and fourth solar panels about said second connector in opposite directions from said stored position to said deployed position, wherein said first and second connectors are parallel to each other.

28. A method for operating a satellite assembly comprising a plurality of solar panels, said method comprising the steps of:

disposing said plurality of solar panels in a store position, wherein said disposing step comprises disposing said plurality of solar panels in a stack such that each of said plurality of solar panels is at a different elevation within said stack and such that said plurality of solar panels are in parallel relation within said stack;

deploying said plurality of solar panels from said stored position to a deployed position, wherein said deploying step comprises pivoting each of said plurality of solar panels form said stored position to said deployed position; and maintaining each of said plurality of solar panels in said parallel relation throughout said deploying step.

29. A satellite assembly, as claimed in claim 28, wherein:

said plurality of solar panels comprises first and second solar panels, wherein said deploying step comprises pivoting said first and second solar panels about a common axis and in opposite directions about said common axis.

30. A satellite assembly comprising:

first and second flat structural members containing a satellite payload;

first and second tubular members connecting said first and second structural members such that said first structural member is above said second structural member in a spaced relationship;

a plurality of solar panels movably connected to said tubular members between said first and second structural members, said solar panels being movable from a stored position between said first and second structural members to a deployed position external of said first and second structural members;

means to bias said plurality of solar panels to said deployed position; and means to releasably secure said plurality of solar panels in said stored position.

\* \* \* \* \*

UNITED STATES PATENT AND TRADEMARK OFFICE
CERTIFICATE OF CORRECTION

PATENT NO.   : 6,543,724 B1
DATED        : April 8, 2003
INVENTOR(S)  : Barnett

It is certified that error appears in the above-identified patent and that said Letters Patent is hereby corrected as shown below:

Column 4,
Line 33, delete the word "relations" and insert therefor -- relation --;

Column 5,
Lines 61, 64 and 67, delete the words "satellite assembly", and insert therefor -- method --;

Column 6,
Lines 3, 5, 8, 12, 16 and 43, delete the words "satellite assembly", and insert therefor -- method --; and
Line 30, delete the word "store", and insert therefor -- stored --.

Signed and Sealed this

Sixteenth Day of September, 2003

JAMES E. ROGAN
*Director of the United States Patent and Trademark Office*

UNITED STATES PATENT AND TRADEMARK OFFICE
CERTIFICATE OF CORRECTION

PATENT NO.   : 6,543,724 B1
DATED        : April 8, 2003
INVENTOR(S)  : Barnett

It is certified that error appears in the above-identified patent and that said Letters Patent is hereby corrected as shown below:

Column 5,
Line 4, delete "claim 8" and insert therefor -- claim 17 --.
Lines 12 and 19, delete "claim 8" and insert therefor -- claim 2 --.

Column 6,
Line 18, delete "claim 18" and insert therefor -- claim 9 --.

Signed and Sealed this

Seventh Day of September, 2004

JON W. DUDAS
*Director of the United States Patent and Trademark Office*